United States Patent [19]

Miller

[11] 4,418,939
[45] Dec. 6, 1983

[54] STORAGE OF A SEAT BELT ON A DOOR

[75] Inventor: Larry D. Miller, Rochester, Mich.

[73] Assignee: General Motors Corporation, Detroit, Mich.

[21] Appl. No.: 345,081

[22] Filed: Feb. 2, 1982

[51] Int. Cl.³ .............................................. B60R 21/02
[52] U.S. Cl. .................................... 280/803; 280/808
[58] Field of Search ................................ 280/801–808; 297/469, 474–485

[56] References Cited

U.S. PATENT DOCUMENTS 4,213,638 7/1980 Sacco et al. .......................... 280/808
4,244,601 1/1981 Nilsson ................................. 280/808
4,264,089 4/1981 Maekawa et al. .................... 280/808

FOREIGN PATENT DOCUMENTS 2435767 2/1976 Fed. Rep. of Germany .

Primary Examiner—Richard A. Bertsch
Attorney, Agent, or Firm—Charles E. Leahy

[57] ABSTRACT

A belt storage arrangement for a shoulder belt mounted on the upper rear corner of the door and a lap belt mounted on the lower rear corner of the door. A storage buckle is mounted on the upper rear corner of the door adjacent the shoulder belt anchorage and is adapted to receive a latch plate carried by the inboard ends of the lap and shoulder belt so that the lap and shoulder belt hang generally vertical along the rear edge of the door. A slip ring slidably encircles the lap and shoulder belts and falls vertically along the vertically hanging lap and shoulder belts to couple the belts in a neatly stored position overlying one another. When the latch plate is engaged with a buckle conventionally mounted inboard the seat, the lap and shoulder belts are established in their occupant restraining positions and the slip ring slides along the belts to assume a position adjacent the latch plate inboard the occupant to enable the positioning of the lap and shoulder belts along their separate paths across the seated occupant.

2 Claims, 2 Drawing Figures

STORAGE OF A SEAT BELT ON A DOOR

The invention relates to a seat belt system having the outboard ends of the lap and shoulder belts mounted on the door and more particularly provides a storage arrangement including an auxiliary storage buckle mounted on the door adjacent the shoulder belt anchorage for engagement by the latch plate carried by the belts and a slip ring which falls along the vertically hanging lap and shoulder belts to maintain an overlying neat stored relationship along the door.

BACKGROUND OF THE INVENTION

It is known in motor vehicle occupant restraint systems to have a shoulder belt and mounted on the upper rear corner of the door and a lap belt end mounted on the lower rear corner of the door. A first buckle element such as a latch plate is carried by the inboard end of the lap and shoulder belts and is adapted for engagement within a second buckle element such as a buckle mounted on the vehicle body inboard the occupant seat so that the lap and shoulder belts are established in restraining positions across the seat when the door is closed. The buckle permits disengagement of the latch plate therefrom to enable opening of the door and occupant freedom for occupant ingress and egress.

It is also known that the buckle mounted inboard the seat may be mounted on the floor by a length of belt wound by a retractor so that the lap and shoulder belts function as a passive restraint system in that whenever the door is opened the outboard ends of the lap and shoulder belts are automatically moved outwardly and forwardly to enable occupant ingress and egress. The latch plate may be disconnected from the buckle if use of the passive restraint arrangement is not desired by the occupant.

It is also known to provide a hook or the like on the door for engagement by the first buckle element carried by the belt when the buckle is unbuckled to store the lap and shoulder belts on the door for opening and closing movement therewith. Such hooks are conventionally mounted at or near the forward edge of the door so that the shoulder belt extends diagonally down across the window and the lap belt extends diagonally up across the door trim panel, arm rest and door handle.

It would be desirable to store the lap and shoulder belts on the door in a neatly stored position overlying one another in order to reduce the visible presence of the belt system on the door and to obviate the necessity of having the shoulder belt extend in a highly visible path across the window.

SUMMARY OF THE INVENTION

According to the present invention the storage element is comprised of a storage buckle which is mounted on the upper rear corner of the door adjacent the anchorage of the shoulder belt on the door. The storage buckle receives the latch plate carried by the inboard ends of the lap and shoulder belts so that the lap belt and shoulder belt hang generally vertical along the rear edge of the door. A slip ring slidably encircles both the lap and shoulder belts. When the latch plate is engaged in the storage buckle on the door, the slip ring falls along the vertically hanging lap and shoulder belts to couple the shoulder belt and lap belt in a neat overlying vertically extending stored relationship along the rear edge of the door. When the latch plate is engaged with the buckle conventionally mounted inboard the seat, the lap and shoulder belts are established in their occupant restraining positions, and the slip ring slides along the belts to assume a position adjacent the latch plate to enable the positioning of the lap and shoulder belts along their separate paths across the seated occupant.

DESCRIPTION OF THE DRAWINGS

These and other objects, features and advantages of the invention will become apparent on consideration of the specification and the appended drawings in which.

DESCRIPTION OF THE PREFERRED EMBODIMENT

Figure 1:
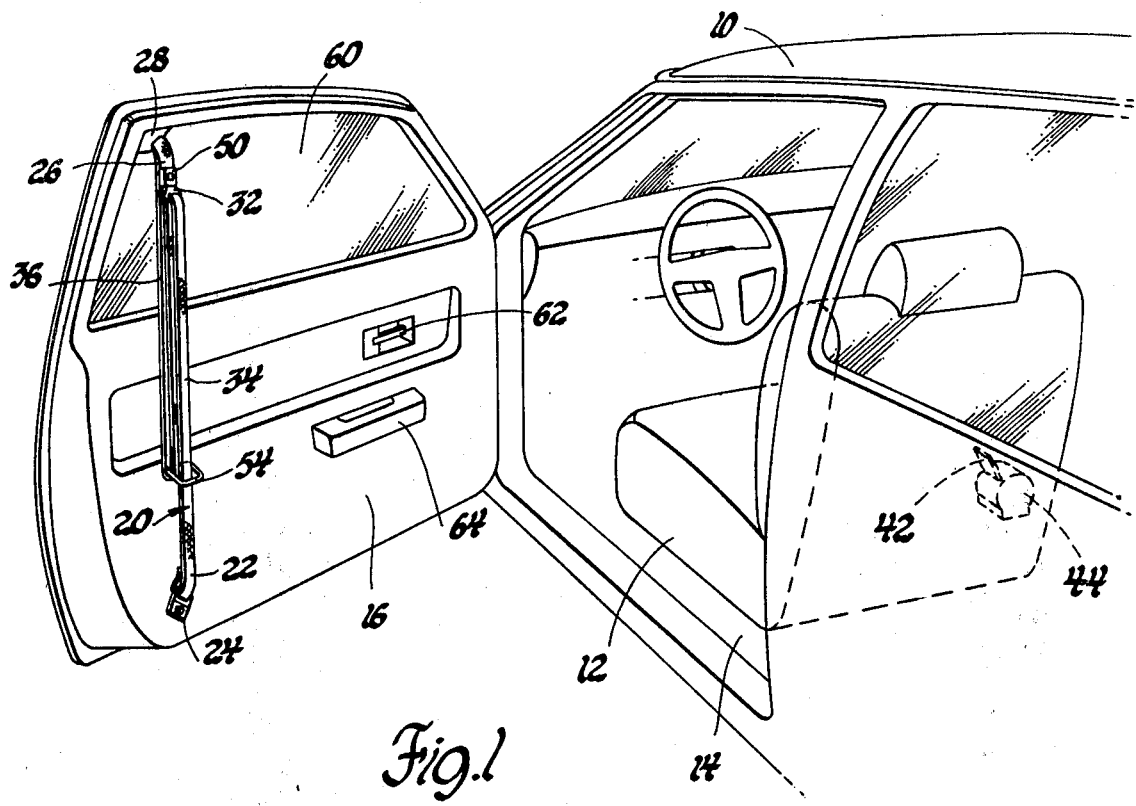
FIG. 1 is a perspective view of a vehicle body having an occupant restraint system according to the invention and showing the vehicle door in the open position and the lap and shoulder belts established in a neat overlying stored relationship on the door.

Referring to FIG. 1, there is shown a vehicle body 10 having an occupant seat 12 conventionally mounted on the vehicle floor 14. A door 16 is hingedly mounted on the vehicle body 10 for pivotal movement between an open position shown in FIG. 1 and a closed position shown in FIG. 2.

Figure 2:
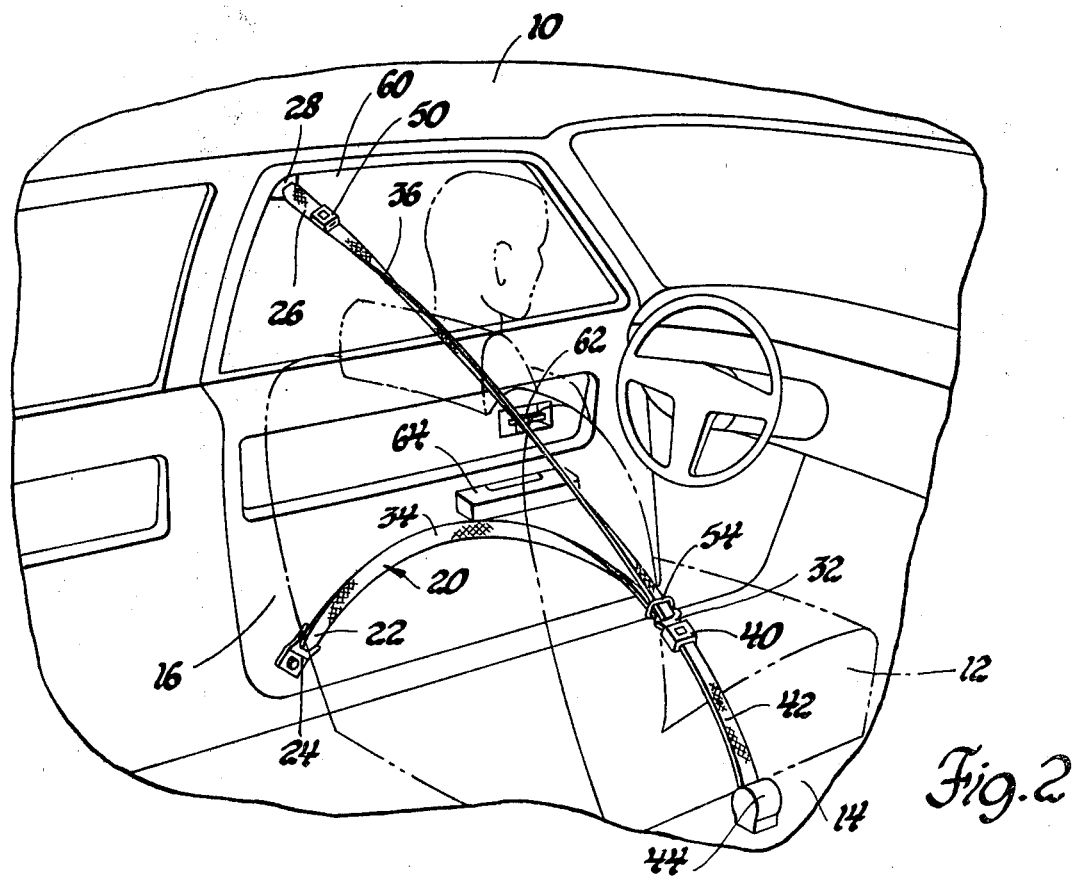
FIG. 2 is a perspective view showing the vehicle door in the closed positions and the lap and shoulder belt portions established in their normal occupant restraining positions.

An occupant restraint system is provided for restraining the occupant in the seat 12. Referring to FIG. 2, it is seen that the occupant restraint system includes a continuous-loop of restraint belt 20 having its lower end 22 attached to the lower rear corner of the door by an anchor bracket 24 and an upper end 26 suitably attached to the upper rear corner of the door by a bracket 28. A conventional latch plate 32 slidably encircles the continuous-loop belt 20 to divide the belt 20 into a lap belt portion 34 and a shoulder belt portion 36. The latch plate 32 is adapted for latching engagement within a conventional buckle 40 which is mounted on the vehicle floor 14 inboard the seat 12 by a control belt 42 and a retractor 44.

The aforedescribed occupant restraint system may be used as an active belt system or as a passive belt system. As an active belt system, the occupant may release the buckle 40 by depressing the pushbutton thereof to disengage the latch plate 32 from the buckle. Accordingly the vehicle door 16 may be opened and the occupant can egress the vehicle. The belt system operates as a passive belt system if the occupant merely opens the door without disengaging the buckle 40. The swing geometry of the door moves the outboard ends of the lap belt portion 34 and shoulder belt portion 36 outwardly and forwardly as permitted by unwinding of the control belt 42 from the retractor 44. Accordingly, the belt system is moved generally outwardly and forwardly to enable the occupant to egress the vehicle. When the belt system is used in the passive mode of operation, the occupant may disengage the buckle 40 to facilitate vehicle cleaning and maintenance or under other circumstances such as loading or unloading parcels into the vehicle.

Referring again to FIG. 1, it is seen that the present invention provides a new and improved arrangement for storing the lap and shoulder belts on the door. An auxiliary storage buckle 50 similar to the buckle 40 is suitably mounted on the upper end of the continuous-loop belt 20 at the upper rear corner of the door. The occupant may engage the latch plate 32 with the storage buckle 50 so that the continuous-loop belt 20 hangs generally vertically along the rear end of the door. A slip ring 54 slidably encircles the lap belt and shoulder belt portions on opposite sides of the latch plate 32. Accordingly, as seen in FIG. 1, the slip ring 54 will fall vertically along the lap and shoulder belts to establish the belt portions in a neatly stored overlying relationship. As seen in FIG. 2, whenever the belt system is disposed in its occupant restraining position, the slip ring 54 is disposed directly adjacent the latch plate 32 so that the slip ring does not interfere with the positioning of the lap belt and the shoulder belt along their separate paths across the occupant.

Referring again to FIG. 1, it is seen that the location of the storage buckle 50 at the upper rear corner of the door adjacent the mounting of the upper belt end 26 and generally in a direct vertical alignment with the attachment of the lower belt end 22 causes the stowed belts to fall vertically across the window 60 to thereby minimize the visual presence of the stored belt. Furthermore, it is seen that the stowage of the lap and shoulder belts in a vertical hanging relationship along the rear edge of the door eliminates any interference of the belts with the door handle 62 or the armrest 64.

While the invention has been disclosed herein primarily in terms of the specific embodiment shown in the drawings, it is not intended to be limited thereto but rather only to the extent set forth in the appended claims. It will be understood that the buckle 40 may be fixedly attached to the vehicle floor inboard the occupant seat instead of being mounted by a control belt 42 and a retractor 44 in those instances where active operation of the seat belt is intended. Furthermore, it will be understood that the seat belt storage element at the upper rear corner of the door need not be a buckle 50 but could be a simple hook or any other suitable device for coupling with the buckle element carried by the inboard ends of the lap and shoulder belts. Furthermore, it will be understood that the buckle may be carried by the inboard ends of the lap and shoulder belts and that the latch plate may be mounted on the vehicle body inboard the seat and a second latch plate provided at the upper rear corner of the door for engagement by the buckle to establish the vertical hanging stored position of the lap and shoulder belts.

The embodiments of the invention in which an exclusive property or privilege is claimed are defined as follows:

1. In an occupant restraint system having a shoulder belt end mounted on the upper rear corner of the door and a lap belt end mounted on the lower rear corner of the door and a first buckle element carried by the shoulder belt and lap belt and adapted for engagement within a second buckle element mounted on the vehicle body inboard the occupant seat so that lap and shoulder belt portions are established in restraining positions across the seat when the door is closed, said second buckle element permitting disengagement of the first buckle element therefrom; the improvement comprising:

an auxiliary storage element mounted on the upper rear corner of the door and adapted for engagement by the first buckle element so that the lap belt portion and shoulder belt portion are stored in a generally vertically hanging relationship along the door, and a slip ring encircling both the lap and shoulder belts, said slip ring being slidable along the lap and shoulder belts so that the slip ring assumes a position adjacent the first buckle element when the first buckle element is engaged with the second buckle element to enable separate positioning of the lap and shoulder belts across the seat and said slip ring falling along the vertically hanging lap and shoulder belts when the first buckle element is engaged in the auxiliary storage element so that the slip ring couples the shoulder belt and lap belt in overlying neat stored relationship along the door.

2. In an occupant restraint system having a shoulder belt end mounted on the upper rear corner of the door and a lap belt end mounted on the lower rear corner of the door and a latch plate carried by the shoulder belt and lap belt and adapted for engagement within a buckle mounted on the vehicle body inboard the occupant seat so that lap and shoulder belt portions are established in restraining positions across the seat when the door is closed, said buckle permitting disengagement of the latch plate therefrom; the improvement comprising:

a storage buckle mounted on the upper rear corner of the door and adapted for engagement by the latch plate so that the lap belt portion and shoulder belt portion are stored in a generally vertically hanging relationship along the door, and a slip ring encircling both the lap and shoulder belts, said slip ring being slidable along the lap and shoulder belts so that the slip ring assumes a position adjacent the latch plate when the latch plate is engaged with the buckle to enable separate positioning of the lap and shoulder belts across the seat and said slip ring falling along the vertically hanging lap and shoulder belts when the latch plate is engaged with the storage buckle so that the slip ring couples the shoulder belt and lap belt in overlying neat stored relationship along the door.

* * * * *